No. 874,220. PATENTED DEC. 17, 1907.
C. H. MAIBEN.
LAUNDRY MARKING MACHINE.
APPLICATION FILED MAR. 8, 1907.
2 SHEETS—SHEET 1.
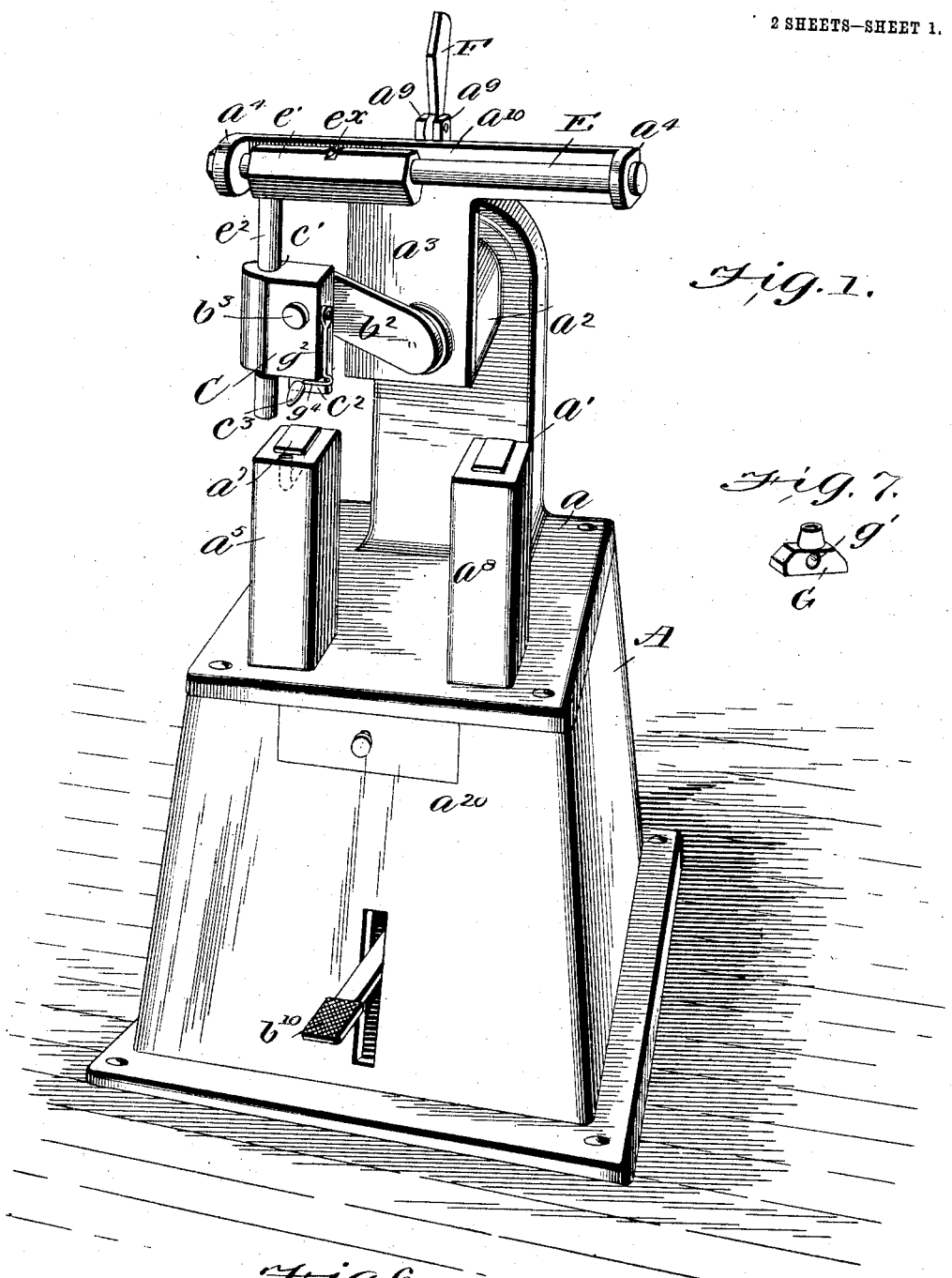
WITNESSES
F. C. Barry
C. E. Trainor
INVENTOR
CHARLES H. MAIBEN
BY Munn & Co.
ATTORNEYS No. 874,220. PATENTED DEC. 17, 1907.
C. H. MAIBEN.
LAUNDRY MARKING MACHINE.
APPLICATION FILED MAR. 8, 1907.
2 SHEETS—SHEET 2.
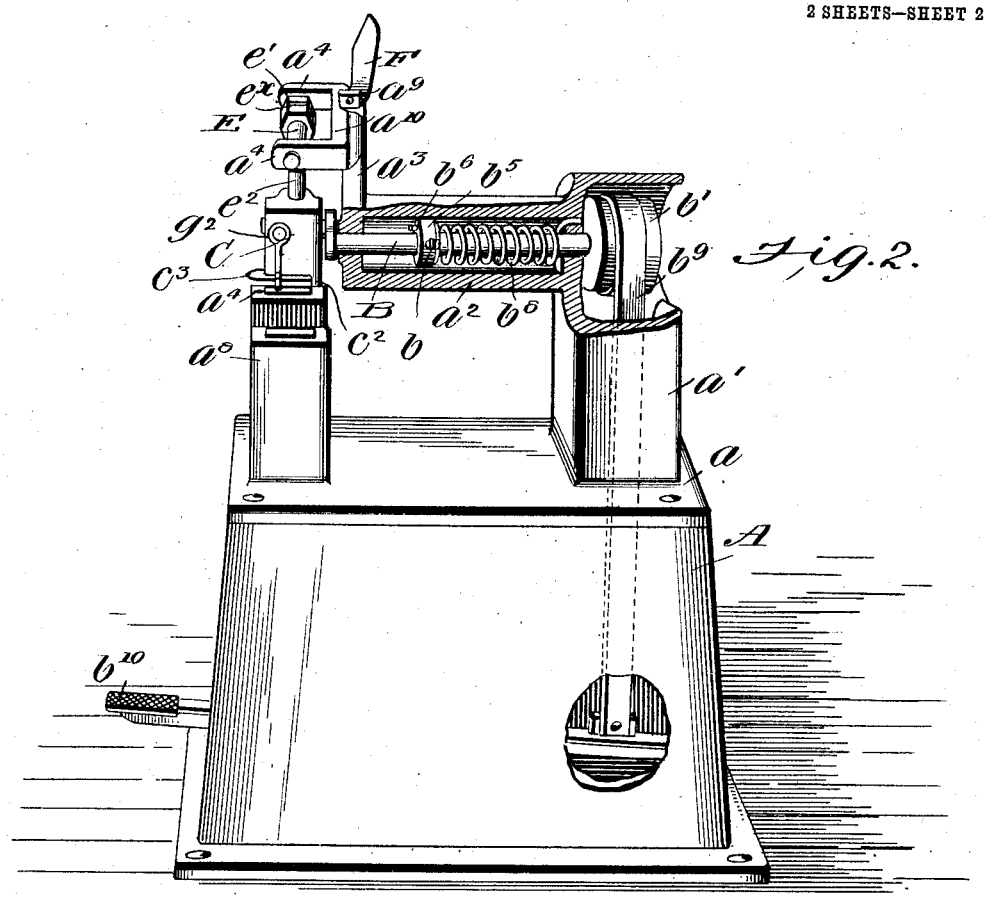
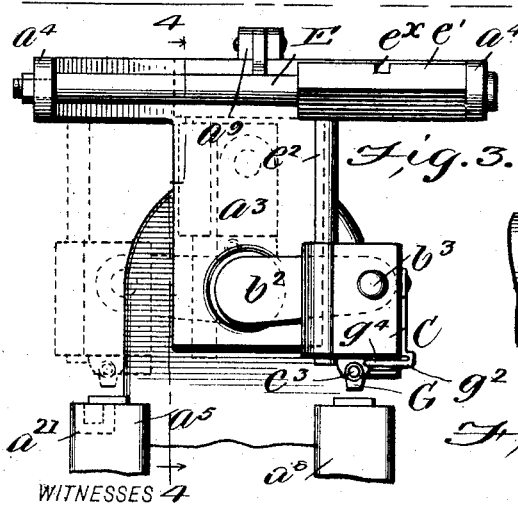
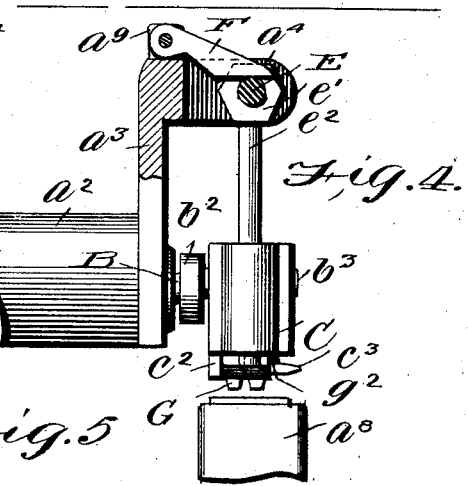
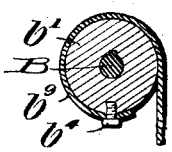
WITNESSES
INVENTOR
CHARLES H. MAIBEN
BY
ATTORNEYS

UNITED STATES PATENT OFFICE.

CHARLES HENRY MAIBEN, OF LOGANSPORT, INDIANA.

LAUNDRY-MARKING MACHINE.

No. 874,220.

Specification of Letters Patent.

Patented Dec. 17, 1907.

Application filed March 8, 1907. Serial No. 361,230.

*To all whom it may concern:*

Be it known that I, CHARLES HENRY MAIBEN, a citizen of the United States, and a resident of Logansport, in the county of Cass and State of Indiana, have made certain new and useful Improvements in Laundry-Marking Machines, of which the following is a specification.

My invention is an improvement in laundry marking machines and consists in certain novel constructions and combinations of parts hereinafter described and claimed.

In the drawing—Figure 1 is a front perspective view of the machine. Fig. 2 is a side view in perspective, partly broken away. Fig. 3 is a front view of a portion of the machine. Fig. 4 is a section on the line 4—4 of Fig. 3. Fig. 5 is a section through the pulley, and Fig. 6 is a perspective view of the type tray. Fig. 7 is a perspective view of the type used in the machine.

The present embodiment of my invention comprises a suitable support A, on which is mounted the marking mechanism proper, the said mechanism being supported by a casting comprising a base $a$, having projecting upwardly therefrom a hollow bracket $a'$, provided with a horizontal bearing arm $a^2$, the said bearing arm being provided at each end with bearings and having at the free end thereof an upward extension $a^3$, and integral with the extension is a transverse arm $a^{10}$, having at each end lugs $a^4$ provided with bearings for a purpose to be hereafter described.

A shaft B is journaled in the bearing arm, the said shaft having upon the end within the hollow bracket a pulley $b'$, to the peripheral face of which is connected a strap $b^9$, by means of a set screw $b^4$, the other end of the strap being connected with a treadle $b^{10}$, pivoted to the support. The opposite end of the shaft B projects from the horizontal bearing arm, and is provided with a crank arm $b^2$ having a journal pin $b^3$. A spring $b^8$ encircles the shaft within the bearing arm, and one end of the spring is secured to the bearing arm in any suitable manner, the other end engaging an opening $b^6$ in a collar $b^5$ adjustably secured to the shaft by a set screw $b^\times$. The strap is connected with the pulley in such manner, that when the treadle is depressed the shaft will be rotated a half turn and the spring is adapted to return the shaft to its original position.

A type block C is journaled on the journal pin of the shaft, and the lower face of the type block at one side thereof, is provided with a depending flange $c^2$, and a pin $c^3$ projects horizontally from said flange, the pin being adapted to pass through an opening $g$ in the type G.

A rod E is arranged above the shaft, the said rod being provided with reduced ends for engaging the bearings in the lugs $a^4$, and slidably mounted on the rod is a block $e'$, provided with a depending pin $e^2$, passing through a vertical bearing $c'$ in the type block C.

At one side of the shaft on the base $a$, is an inking block $a^5$, the said block being in position for engagement by the type when the type block is on one side of the shaft, and on the opposite side of the shaft is a printing block $a^8$, the said printing block being in position for engagement by the type when the shaft is rotated substantially a half turn. The inking block $a^5$ is provided at its upper end with an opening for receiving an inking pad $a^7$.

The transverse arm $a^{10}$, is provided at the center thereof, with a pair of spaced lugs $a^9$, in which is pivoted a locking arm F, the locking arm being adapted to engage a notch $c^\times$ in the sliding block $e'$, in such position as to retain the type block in position between the inking block and the printing block, whereby to permit access to the type, for the purpose of removal, and a tray H is made use of for supporting the type when not in use.

The type G are usually of copper, and have a flat base for engaging the lower face of the type block, the cross section of the pin $c^3$ being somewhat less than the diameter of the opening in the type, so that when the face of the type is engaged with the printing block, the said type may move to bring the base of the type in contact with the printing block whereby to secure a firm and equal pressure on the type. The type are held on the pin by a catch $g^2$, which is pivoted to the type block at $g^3$ and is provided with a lateral arm $g^4$ for engaging the outer side of the type as shown in Fig. 3.

The catch $g^2$ is retained in position by friction and by gravity, and a drawer $a^{20}$ is arranged in the support in which may be placed the tray H. An opening $a^{21}$ is arranged in the inking block $a^5$, leading from the surface to the pad receiving opening, by means of which ink may be introduced. The pad is usually formed of sponge.

In operation, the locking arm is raised and the type block is thrown over into a position such that the type rests on the inking pad by the action of the spring $b^8$. The article to be marked is placed on the printing block $a^8$, and pressure is made upon the treadle which partially rotates the shaft through the strap connection to swing the type block to the opposite side of the shaft whereby to bring the type into contact with the article to be marked. The type block is retained in the same relative position with respect to the inking block and the printing block during its movement of translation, by means of the sliding block $e'$ and the depending pin $e^2$.

I claim—

1. A machine of the class described, comprising a base having integral therewith a hollow bracket provided with a horizontal arm having bearings at the ends thereof, a shaft journaled in the bearings, said shaft having at one end within the bracket a pulley, and at the other end a crank arm provided with a journal pin, a spring encircling the shaft within the horizontal arm and having one end thereof engaging said arm, a collar adjustably mounted on the shaft and provided with an opening for engaging the other end of the spring, a transverse arm secured to the end of the horizontal arm, said transverse arm being provided at each end with a lug having a bearing therethrough, a rod having its ends supported in the bearings, a block slidable on the rod and provided with a depending pin, a type block journaled on the crank pin of the shaft and provided with a vertical opening through which slides the pin, said block having a depending flange at one side thereof, and a pin projecting horizontally from the flange for supporting a type, an inking block on one side of the shaft in position to be engaged by the type, a printing block on the other side of the shaft in position to be engaged by the type when the shaft is rotated a half turn, and means for partially rotating said shaft.

2. A machine of the class described, comprising a support, a shaft journaled on the support, said shaft having at one end a crank arm provided with a journal pin, a rod arranged above and transversely of the shaft, a block slidable on the rod and provided with a depending pin, a type block journaled on the journal pin and having a vertical opening in which slides the depending pin, said block having at one side thereof a depending flange and a pin projecting horizontally from the flange for supporting a type, an inking block on one side of the shaft in position to be engaged by the type, a printing block on the other side of the shaft in position for engagement by the type when the shaft is rotated a half turn, means for partially rotating the shaft, a spring for returning the shaft to its original position, and a locking arm engaging the sliding block for retaining the type block in a position midway between the inking block and the printing block.

3. A machine of the class described, comprising a support, a shaft journaled on the support, said shaft having at one end a crank arm provided with a journal pin, a rod arranged above and transversely of the shaft, a block slidable on the rod and provided with a depending pin, a type block journaled on the journal pin and having a vertical opening in which slides the depending pin, said block having at one side thereof a depending flange and a pin projecting horizontally from the flange for supporting a type, an inking block on one side of the shaft in position for engagement by the type, a printing block on the other side of the shaft in position for engagement by the type when the shaft is rotated a half turn, means for partially rotating the shaft, and a spring for returning the shaft to its original position.

4. A machine of the class described, comprising a shaft having at one end thereof a crank arm provided with a journal pin, a rod arranged above the shaft and transversely thereto, a block slidable on the rod and provided with a depending pin, a type block journaled on the journal pin and having an opening through which slides the depending pin, means on the block for supporting a type, an inking block on one side of the shaft in position for engagement by the type, a printing block on the opposite side of the shaft in position for engagement by the type when the shaft is rotated a half turn, means for partially rotating the shaft, and means for returning the shaft to its original position.

5. A machine of the class described, comprising a shaft, having at one end thereof a crank arm, a transverse rod above the shaft, a block slidable on the rod and provided with a depending pin, a type block connected with the crank arm and having an opening through which slides the pin, means on the block for supporting a type, an inking block on one side of the shaft in position for engagement by the type, a printing block on the opposite side of the shaft in position for engagement by the type when the shaft is rotated a half turn, and means for partially rotating the shaft.

CHARLES HENRY MAIBEN.

Witnesses:
GEORGE S. KISTLER,
KATHERINE GRANGER.